J. McKENNA AND H. E. CHASE.
EXTENSION ROD.
APPLICATION FILED JUNE 20, 1921.
1,412,561.
Patented Apr. 11, 1922.
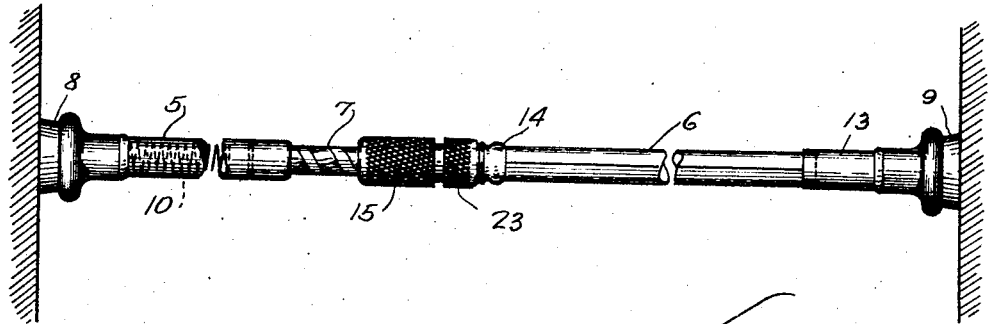
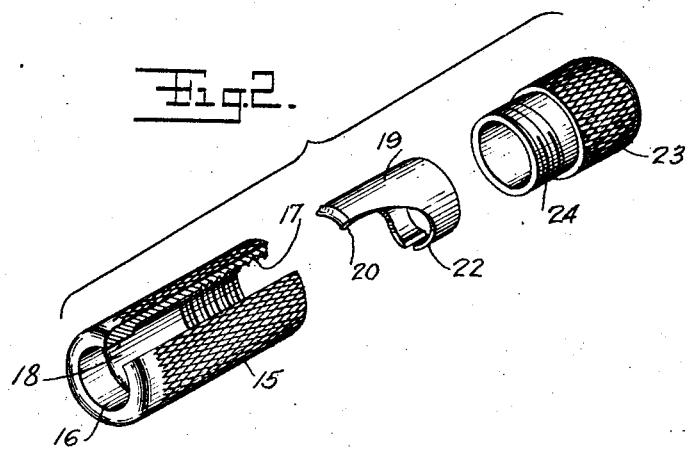
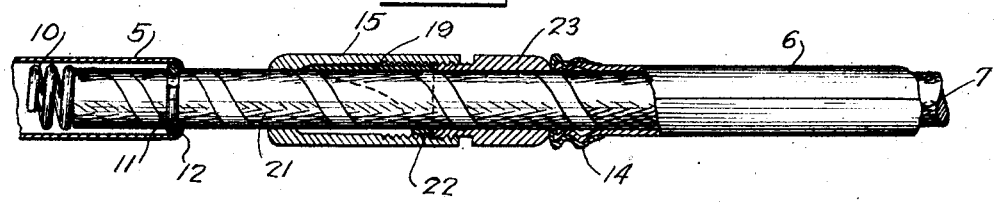
Inventors
James McKenna
Henry E. Chase
By their Attorneys

UNITED STATES PATENT OFFICE.

JAMES McKENNA AND HENRY E. CHASE, OF WALLINGFORD, CONNECTICUT, ASSIGNORS TO H. L. JUDD COMPANY, OF WALLINGFORD, CONNECTICUT, A CORPORATION OF NEW YORK.

EXTENSION ROD.

1,412,561.      Specification of Letters Patent.      Patented Apr. 11, 1922.

Application filed June 20, 1921. Serial No. 478,857.

*To all whom it may concern:*

Be it known that we, JAMES McKENNA and HENRY E. CHASE, citizens of the United States of America, residing at Wallingford, Connecticut, have invented a new and useful Extension Rod, of which the following is a specification.

Our invention relates particularly to what are sometimes called curtain rods. The main object is to provide a simple form of rod which may be readily adjusted to windows or spaces of different widths, and in which the parts are so assembled that they are not likely to become accidentally separated in shipping or handling.

In its preferred form the rod consists of two tubular members and an intermediate member which is adapted to slide in the tubular members. One end of the inner part is secured in one of the tubular members and preferably provided with a spring abutment. The intermediate member is also provided with an adjustable stop having clamping means.

Fig. 1 shows a rod embodying our invention in place between two abutments, the rod, however, being broken away in two places.

Fig. 2 is a perspective view of the parts of the stop device on a larger scale.

Fig. 3 is a side view and partial section of a fragment of the rod on a larger scale.

5 and 6 are the tubular members, one of which may be substantially longer than the other. In this case the member 5 is a seamless tube and the member 6 is rolled up out of sheet metal so that it is split longitudinally. The member 7 is in the form of a solid rod preferably roughened on its outer surface and telescopically extending into the two tubular members. The end members may be provided with pads 8 and 9 for suitable bearings in the window frame or other space to be bridged.

The spring 10 is located within the tubular member 5 and forms an abutment for the intermediate rod member 7. The member 7 is provided with a shoulder which may be formed, for instance, by means of a split ring 11 fitting in a groove and adapted to coact with a flange 12 rolled or spun over at the end of the member 5 so as to prevent the spring 10 from pushing the member 7 out of the tube 5.

The split tubular member 6 may have one end reinforced with a seamless tubular part 13 and the other reinforced with a ferrule or ring 14 which serves as an abutment for the stop member which is adjustable longitudinally on the intermediate member 7.

The stop member has an outer part 15 in the form of a sleeve, one end 16 of which loosely fits the member 7 and the other end of which has an interior screw thread 17. Between the ends is a tapered or shouldered portion 18. Within the sleeve 15 we mount a wedging member 19 which preferably has a roughened end or nib 20 adapted to engage with roughened portions ridges or grooves in the rod member 7. The rod member 7 may be conveniently knurled along the portion 21, for instance, in helical form, with smooth or unknurled portions between. To hold the wedging member 19 in place in the sleeve 15 we may provide it with spring arms 22 adapted to expand against the inner wall of the sleeve. The other part of the stop consists of a sleeve member 23 with a screw threaded part 24 adapted to screw into the thread 17 of the sleeve 15. When the member 23 is screwed into the sleeve 15, it engages the wedge member 19 and pushes it along the incline 18 within the sleeve until the part 20 grips the rod member 7 sufficiently to hold the stop in adjusted position on the rod member 7.

When the parts are assembled in the position shown in Fig. 1, the spring 10 presses the left hand pad 8 against one abutment and presses the rod member 7 toward the right so that the stop member 23 pushes against the reinforcing ring 14 and tube 6, so that the thrust of the spring is taken up by the other pad member 9. To release the rod from its position, one end is pushed toward the other so as to compress the spring and shorten the overall length of the rod. When the rod is removed from its place and pressure on the opposite ends released, the spring 10 pushes the tubular member 5 away from the member 7 until the flange 12 abuts against the stop ring 11, as shown in Fig. 3. It will thus be seen that the rod member 7 cannot be entirely withdrawn from the end member 5 and there is no danger of losing the same or the spring 10. In case the parts 15 and 23 of the stop member are separated, the spring jaws or arms 22 of the wedge member 19 hold it securely in place within the sleeve 15. For a wider window or space it is simply necessary to partially unscrew the parts 15—23 of the stop sleeve and move them along the rod member 7 to the desired position and reclamp them in place, so as to provide a rod of the desired greater over all length.

It will be seen from the foregoing that the two separable sections of the rod may be pulled apart or separated at any time without disturbing the stop adjustment. This permits the curtains to be removed at will for washing, cleaning, or putting away, after which they may be again slipped onto the two rod sections and said two sections may be slid together until the tube 6 engages the stop on the stud 7 which by reason of the fact that it has not been disturbed will cause the rod to assume the predetermined and originally adjusted length. Again inasmuch as the two pads on the rod ends are ordinarily much larger in diameter than the body of the rod, it follows that curtains cannot be slipped onto the outer ends of the rod unless the hem is made unduly large. Since the rod may be easily taken apart at any time without disturbing the adjustment for over all length, it follows that by taking said sections apart the curtains may be readily slipped onto the smaller or intermediate ends.

We claim:

1. A curtain rod comprising two tubular end members, an intermediate member secured to one end member and telescopically insertable into and removable from the other end member, a stop independent of both end members and adjustable on said intermediate member for varying at will and to the desired degree the over all length of said rod, and means for locking said stop in various positions of adjustment on said intermediate member.

2. A curtain rod comprising two tubular end members, an intermediate member secured to one end member and telescopically insertable into and removable from the other end member, a stop independent of both end members and adjustable on said intermediate member for varying at will and to the desired degree the over all length of said rod, and a spring abutment for one end of said rod, and means for locking said stop in various positions of adjustment on said intermediate member.

3. A curtain rod comprising two tubular end members, an intermediate member carried by one end member and telescopically insertable into and removable from the other end member, a stop independent of both end members and adjustable on said intermediate member for varying at will and to the desired degree the over all length of said rod, and a spring abutment for the tubular end member which carries the intermediate member, and means for locking said stop in various positions of adjustment on said intermediate member.

4. A curtain rod comprising two tubular end members, an intermediate member carried by one end member and telescopically insertable into and removable from the other end member, a stop independent of both end members and adjustable on said intermediate member for varying at will and to the desired degree the over all length of said rod, and a spring abutment for the tubular end member which carries the intermediate member, and a flexible pad for each outer end of said rod, and means for locking said stop in various positions of adjustment on said intermediate member.

JAMES McKENNA.
HENRY E. CHASE.